(12) United States Patent
Simoncini et al.

(10) Patent No.: US 10,990,837 B1
(45) Date of Patent: Apr. 27, 2021

(54) SYSTEMS AND METHODS FOR UTILIZING MACHINE LEARNING AND FEATURE SELECTION TO CLASSIFY DRIVING BEHAVIOR

(71) Applicant: Verizon Connect Ireland Limited, Dublin (IE)

(72) Inventors: Matteo Simoncini, Pistoia (IT); Aurel Pjetri, Florence (IT); Francesco Sambo, Florence (IT); Alessandro Lori, Florence (IT); Fabio Schoen, Florence (IT)

(73) Assignee: Verizon Connect Ireland Limited, Dublin (IE)

( * ) Notice: Subject to any disclaimer, the term of this patent is extended or adjusted under 35 U.S.C. 154(b) by 0 days.

(21) Appl. No.: 16/678,924

(22) Filed: Nov. 8, 2019

(30) Foreign Application Priority Data

Oct. 28, 2019 (EP) .................................... 19205766

(51) Int. Cl.
*G06K 9/00* (2006.01)
*B60W 40/09* (2012.01)
*G06N 20/20* (2019.01)
*G06K 9/62* (2006.01)
(Continued)

(52) U.S. Cl.
CPC ......... *G06K 9/00845* (2013.01); *B60W 40/09* (2013.01); *B60W 50/12* (2013.01); *G06K 9/6217* (2013.01); *G06N 20/20* (2019.01); *B60W 2050/0071* (2013.01)

(58) Field of Classification Search
CPC . G06K 9/00845; G06K 9/6217; B60W 40/09; B60W 50/12; B60W 2050/0071; G06N 20/20
See application file for complete search history.

(56) References Cited

U.S. PATENT DOCUMENTS 10,475,127 B1 * 11/2019 Potter .................. B60W 40/09
2018/0046926 A1 * 2/2018 Achin ...................... G06N 5/02
2019/0293440 A1 * 9/2019 Hasemann .............. G06N 20/00

OTHER PUBLICATIONS

Chhabra, et al., "A survey on driver behavior detection techniques for intelligent transportation systems", 2017 7th International Conference on Cloud Computing, Data Science & Engineering—Confluence, Jan. 12-13, 2017, pp. 36-41.
(Continued)

*Primary Examiner* — Daryl C Pope

(57) ABSTRACT

A device may receive vehicle operation data associated with operation of a plurality of vehicles, and may process the vehicle operation data to generate processed vehicle operation data. The device may extract multiple features from the processed vehicle operation data, and may train machine learning models, with the multiple features, to generate trained machine learning models that provide model outputs. The device may process the multiple features, with a feature selection model and based on the model outputs, to select sets of features from the plurality of features, and may process the sets of features, with the trained machine learning models, to generate indications of driving behavior and reliabilities of the indications. The device may select a set of features, from the sets of features, based on the indications and the reliabilities, where the set of features may be calculated by a device associated with a particular vehicle.

20 Claims, 14 Drawing Sheets

(51) Int. Cl.
*B60W 50/12* (2012.01)
*B60W 50/00* (2006.01)

(56) References Cited

OTHER PUBLICATIONS

Engelbrecht, et al., "Survey of smartphone-based sensing in vehicles for intelligent transportation system applications", IET Intell. Transp. Syst., 2015, vol. 9, Iss. 10, pp. 924-935.

Johnson, et al., "Driving Style Recognition Using a Smartphone as a Sensor Platform", 2011 14th International IEEE Conference on Intelligent Transportation Systems Washington, DC, USA. Oct. 5-7, 2011, pp. 1609-1615.

Martinez, et al., "Driving Style Recognition for Intelligent Vehicle Control and Advanced Driver Assistance: A Survey", IEEE Transactions on Intelligent Transportation Systems, vol. 19, No. 3, Mar. 2018, pp. 666-676.

Murphey, et al., "Driver's Style Classification Using Jerk Analysis", 2009 IEEE Workshop on Computational Intelligence in Vehicles and Vehicular Systems, Mar. 30-Apr. 2, 2009, pp. 1-6.

Romera, et al., "Need Data for Driver Behaviour Analysis? Presenting the Public UAH-DriveSet", 2016 IEEE 19th International Conference on Intelligent Transportation Systems (ITSC) Windsor Oceanico Hotel, Rio de Janeiro, Brazil, Nov. 1-4, 2016.

Vaitkus, et al., "Driving Style Classification using Long-Term Accelerometer Information", 2014 19th International Conference on Methods and Models in Automation and Robotics (MMAR), © 2014 IEEE, pp. 641-644, Sep. 2-5, 2014.

Xu, et al., "Establishing Style-Oriented Driver Models by Imitating Human Driving Behaviors", IEEE Transactions on Intelligent Transportation Systems, vol. 16, No. 5, Oct. 2015.

\* cited by examiner

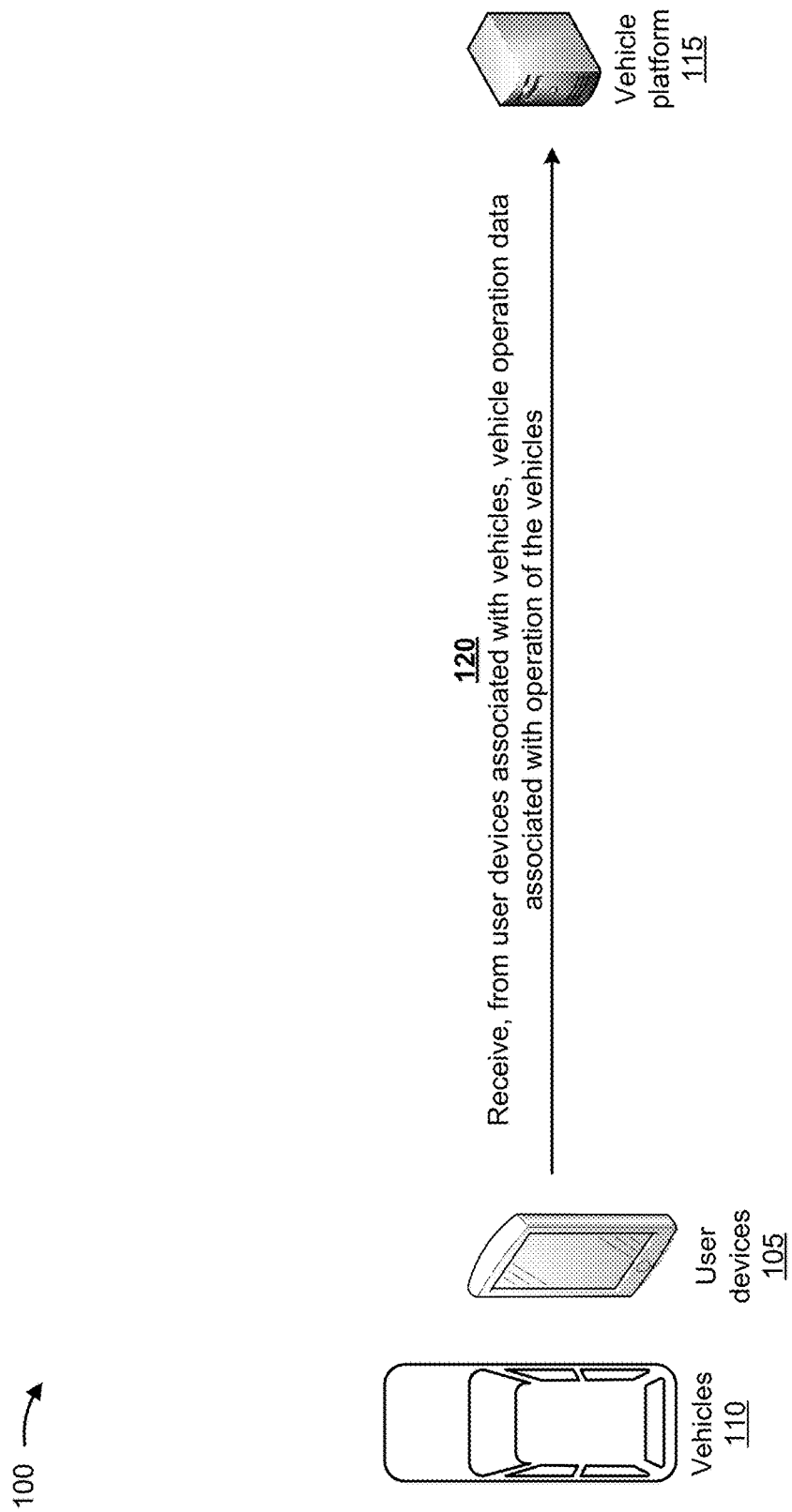

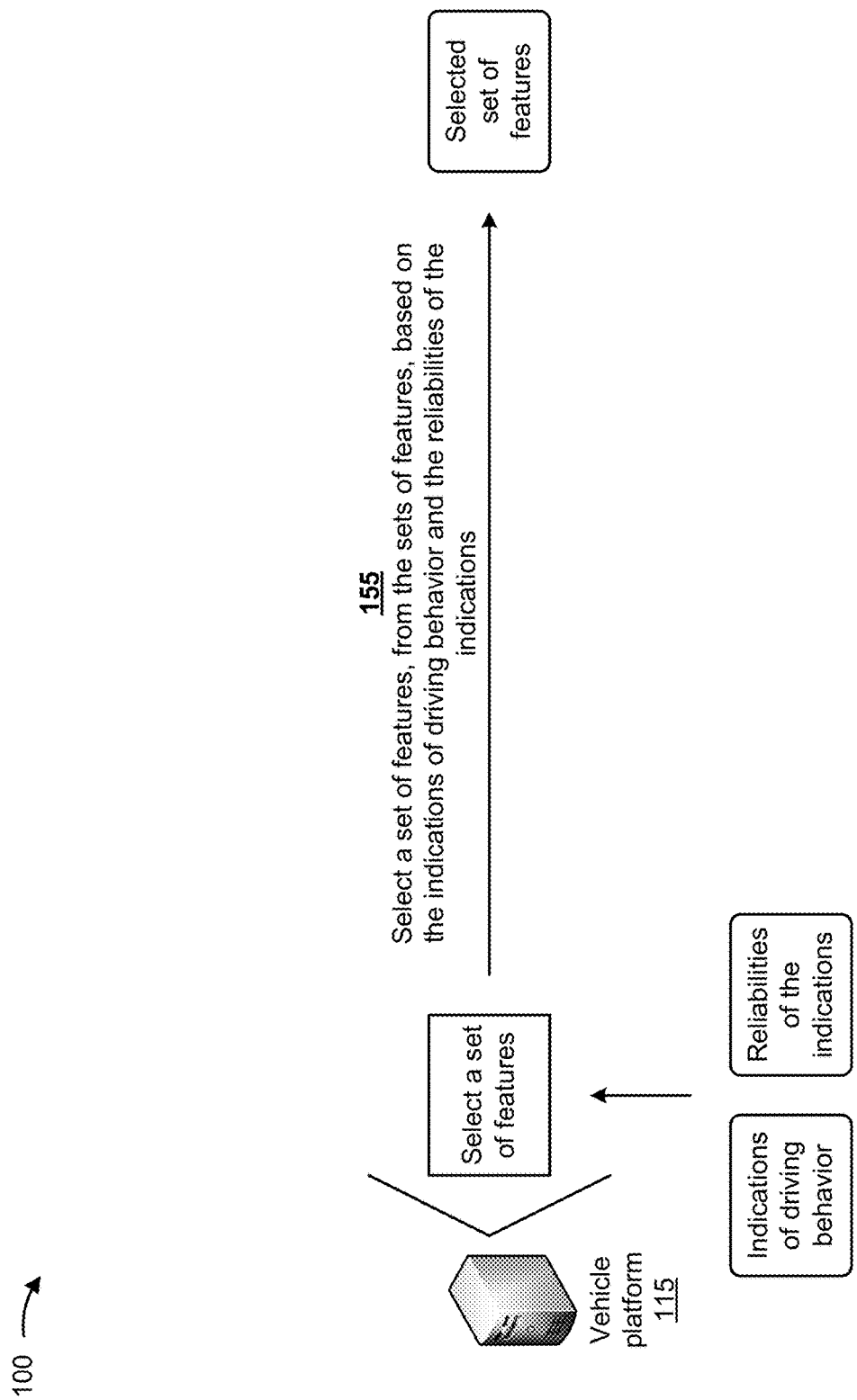

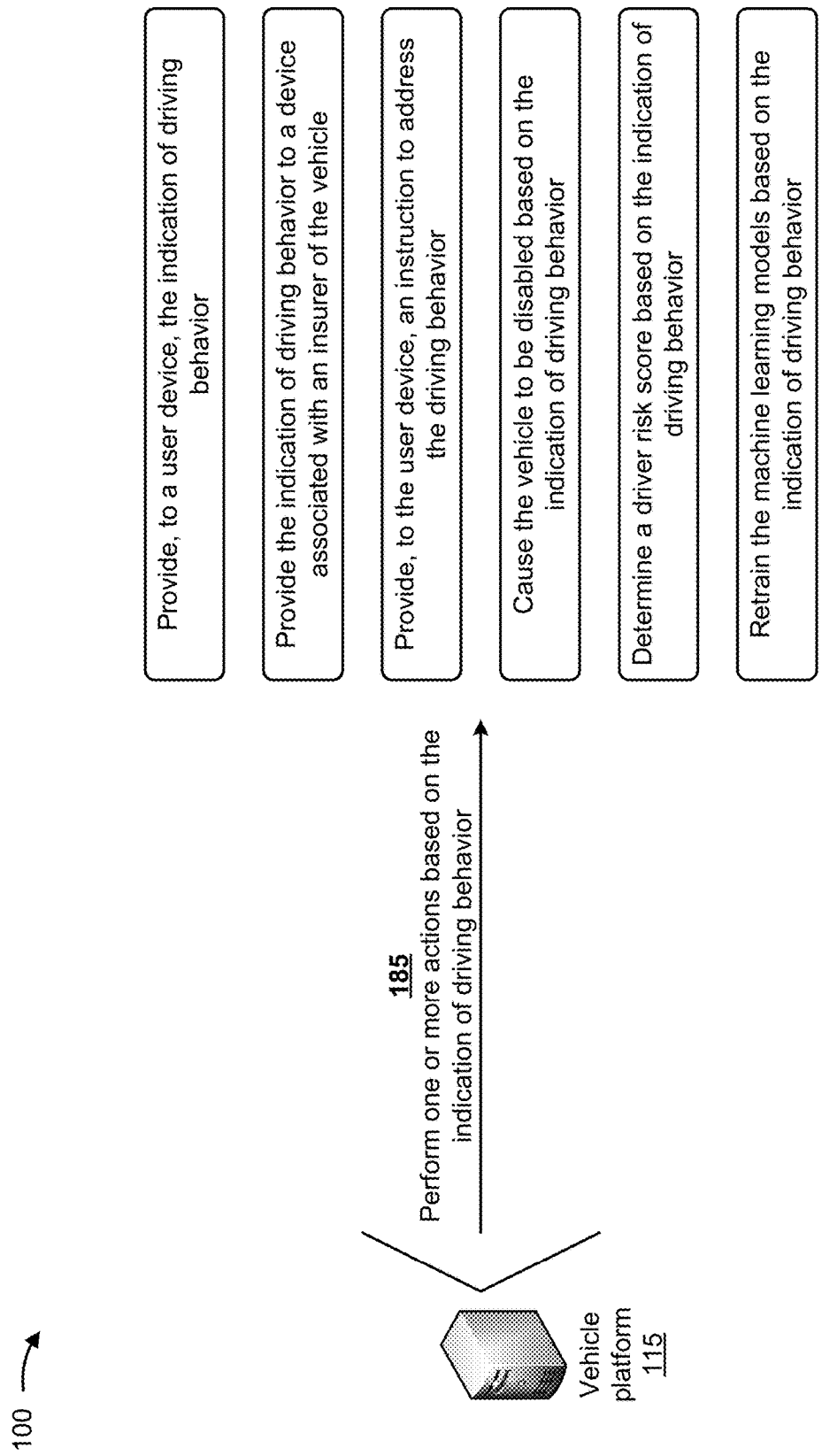

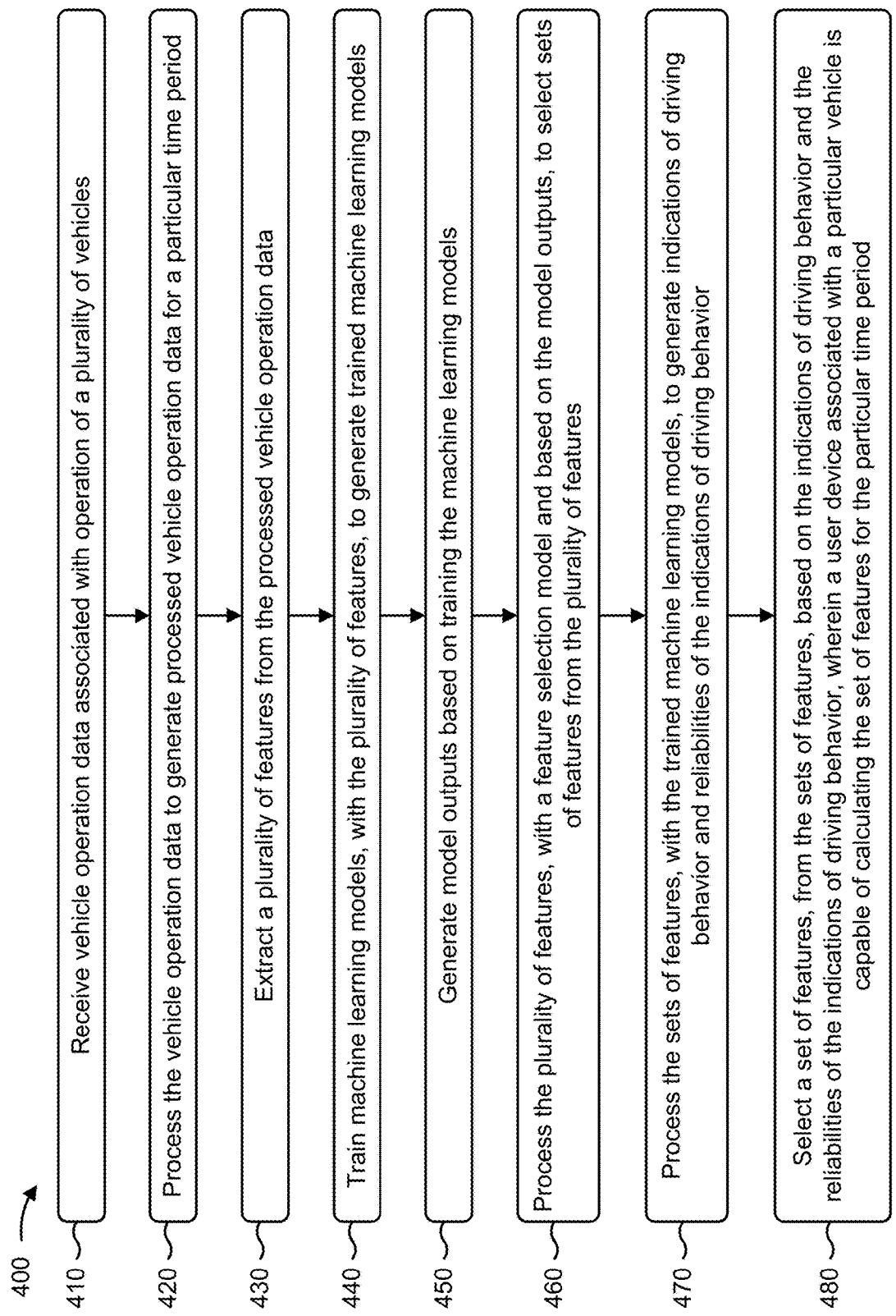

SYSTEMS AND METHODS FOR UTILIZING MACHINE LEARNING AND FEATURE SELECTION TO CLASSIFY DRIVING BEHAVIOR

RELATED APPLICATION

This application claims priority to European Patent Application No. 19205766.9, filed on Oct. 28, 2019, entitled "SYSTEMS AND METHODS FOR UTILIZING MACHINE LEARNING AND FEATURE SELECTION TO CLASSIFY DRIVING BEHAVIOR," which is hereby expressly incorporated by reference herein.

BACKGROUND

Driver behavior classification is a problem of great interest in the intelligent transportation community and is a key component of several applications. First of all, driving style, in combination with other factors such as road type and traffic congestion, has a substantial impact on fuel consumption. Thus, detecting high consumption maneuvers and coaching drivers to avoid them can lead to significant reductions in cost and carbon dioxide emissions. Furthermore, driver behavior classification is closely related to road safety since aggressive drivers tend to operate vehicles in an unsafe manner (e.g., with excessive speed, short car-following distance, erratic lane changes, and imprudent maneuvers), thus increasing risks of road accidents.

BRIEF DESCRIPTION OF THE DRAWINGS

FIGS. 1A-1K are diagrams of one or more example implementations described herein.

FIG. 4 is a flow chart of an example process for utilizing machine learning and feature selection to classify driving behavior.

DETAILED DESCRIPTION OF PREFERRED EMBODIMENTS

Figure 1B:
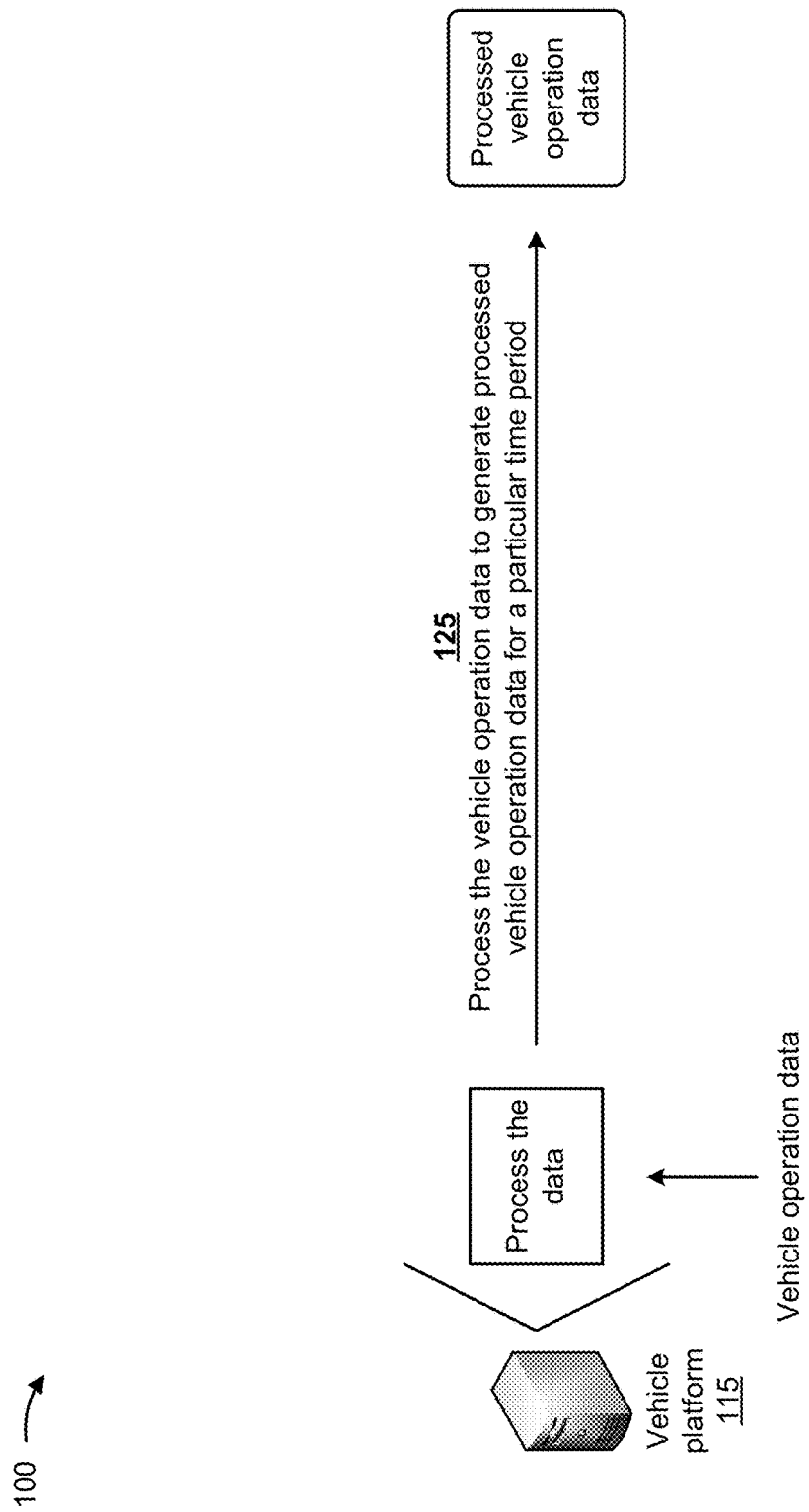

The following detailed description of example implementations refers to the accompanying drawings. The same reference numbers in different drawings may identify the same or similar elements.

Vehicle operation data (e.g., driving data) is generally collected using one or multiple tracking devices installed inside a vehicle. Such tracking devices generally include an inertial measurement unit (IMU), a three-axis accelerometer, a global positioning system (GPS) device, and/or the like. More advanced tracking devices have access to vehicle sensors, via an engine control module (ECM), that collect information associated with pedal positions, steering angle, engine revolutions-per-minute, and/or the like.

Driving behavior may be classified utilizing all vehicle operation data from all vehicle tracking devices and collecting the vehicle operation data from the vehicle tracking devices at a maximum sampling frequency. However, transmission and storage of such vehicle operation data in some domains (e.g., a fleet management company monitoring several millions of vehicles) can be daunting and expensive. Furthermore, vehicle tracking devices have limited computational power and are unable to perform advanced computations required for classification of driving behavior. Thus, current techniques for classifying driving behavior waste computing resources (e.g., processing resources, memory resources, and/or the like), communication resources, networking resources, and/or the like associated with capturing vehicle operation data, transmitting the vehicle operation data, storing the vehicle operation data, and/or the like.

Some implementations described herein provide a vehicle platform that utilizes machine learning and feature selection to classify driving behavior. For example, the vehicle platform may receive vehicle operation data associated with operation of multiple vehicles, and may process the vehicle operation data to generate processed vehicle operation data for a particular time period. The vehicle platform may extract multiple features from the processed vehicle operation data, and may train machine learning models, with the multiple features, to generate trained machine learning models. The vehicle platform may generate model outputs based on training the machine learning models, and may process the multiple features, with a feature selection model and based on the model outputs, to select sets of features from the multiple features. The vehicle platform may process the sets of features, with the trained machine learning models, to generate indications of driving behavior and reliabilities of the indications of driving behavior, and may select a set of features, from the sets of features, based on the indications of driving behavior and the reliabilities of the indications of driving behavior. A user device associated with a particular vehicle may be capable of calculating the set of features for the particular time period.

In this way, the vehicle platform identifies particular features of vehicle operation data to be captured by vehicle devices for a particular time period, and utilizes the particular features to classify driving behavior. A quantity of the particular features and the particular time period ensure that the vehicle devices can process the vehicle operation data and transmit the particular features to the vehicle platform. Thus, the vehicle platform conserves computing resources (e.g., processing resources, memory resources, and/or the like), communication resources, networking resources, and/or the like that would otherwise be wasted in capturing vehicle data, transmitting the vehicle data, storing the vehicle data, and/or the like.

FIGS. 1A-1K are diagrams of one or more example implementations 100 described herein. As shown in FIG. 1A, user devices 105 may be associated with vehicles 110 and a vehicle platform 115. In some implementations, user devices 105 may include sensors that capture vehicle operation data (e.g., data indicating acceleration, speed, movement, and/or the like) associated with vehicles 110 and/or may receive the vehicle operation data from vehicle sensors of vehicles 110, an engine control module (ECM) of vehicles 110, and/or the like.

As further shown in FIG. 1A, and by reference number 120, vehicle platform 115 may receive, from user devices 105 associated with vehicles 110, vehicle operation data associated with operation of the vehicles. In some implementations, the vehicle operation data may include data identifying accelerations of vehicles 110, speeds of vehicles 110, distances of vehicles 110 from other vehicles, pedal positions associated with vehicles 110 (e.g., brake pedals and accelerator pedals), steering angles associated with vehicles 110, engine revolutions-per-minute (RPMs) of vehicles 110, and/or the like.

In some implementations, vehicle platform 115 may receive the vehicle operation data from user devices 105, from inertial measurement units associated with vehicles 110, from three-axis accelerometers associated with vehicles 110, from global positioning system (GPS) devices associated with vehicles 110, from ECMs associated with vehicles 110, from video cameras associated with vehicles 110, and/or the like. Vehicle platform 115 may periodically receive the vehicle operation data, may continuously receive the vehicle operation data, may receive the vehicle operation data based on a request, and/or the like. Vehicle platform 115 may store the vehicle operation data in a data structure (e.g., a database, a table, a list, and/or the like) associated with vehicle platform 115.

As shown in FIG. 1B, and by reference number 125, vehicle platform 115 may process the vehicle operation data to generate processed vehicle operation data for a particular time period. The particular time period may be a time period measured in seconds (e.g., ten seconds, thirty seconds, sixty seconds, and/or the like), in minutes (e.g., two minutes, five minutes, and/or the like), and/or the like. In some implementations, when processing the vehicle operation data, vehicle platform 115 may apply a moving average to the vehicle operation data to generate a low-pass version of the vehicle operation data, and may add the low-pass version of the vehicle operation data to the vehicle operation data to generate the processed vehicle operation data. For example, the vehicle operation data may include raw accelerometer data that includes a non-negligible amount of noise (e.g., mid-to-high frequency noise due to engine vibration, rugged road vibration, and/or the like). Vehicle platform 115 may process the raw accelerometer data, by applying a low-pass filter that employs the moving average, to generate a low-pass version of the accelerometer data. Vehicle platform 115 may add the low-pass version of the accelerometer data and the raw accelerometer data to generate the processed vehicle operation data.

In this way, vehicle platform 115 may generate processed vehicle operation data that includes values for each of a quantity of input variables that represent filtered data as well as raw data. For example, the input variables may include an x-axis raw acceleration variable, a y-axis raw acceleration variable, a z-axis raw acceleration variable, an x-axis filtered acceleration variable, a y-axis filtered acceleration variable, a z-axis filtered acceleration variable, a GPS speed variable, and/or the like.

Figure 1C:
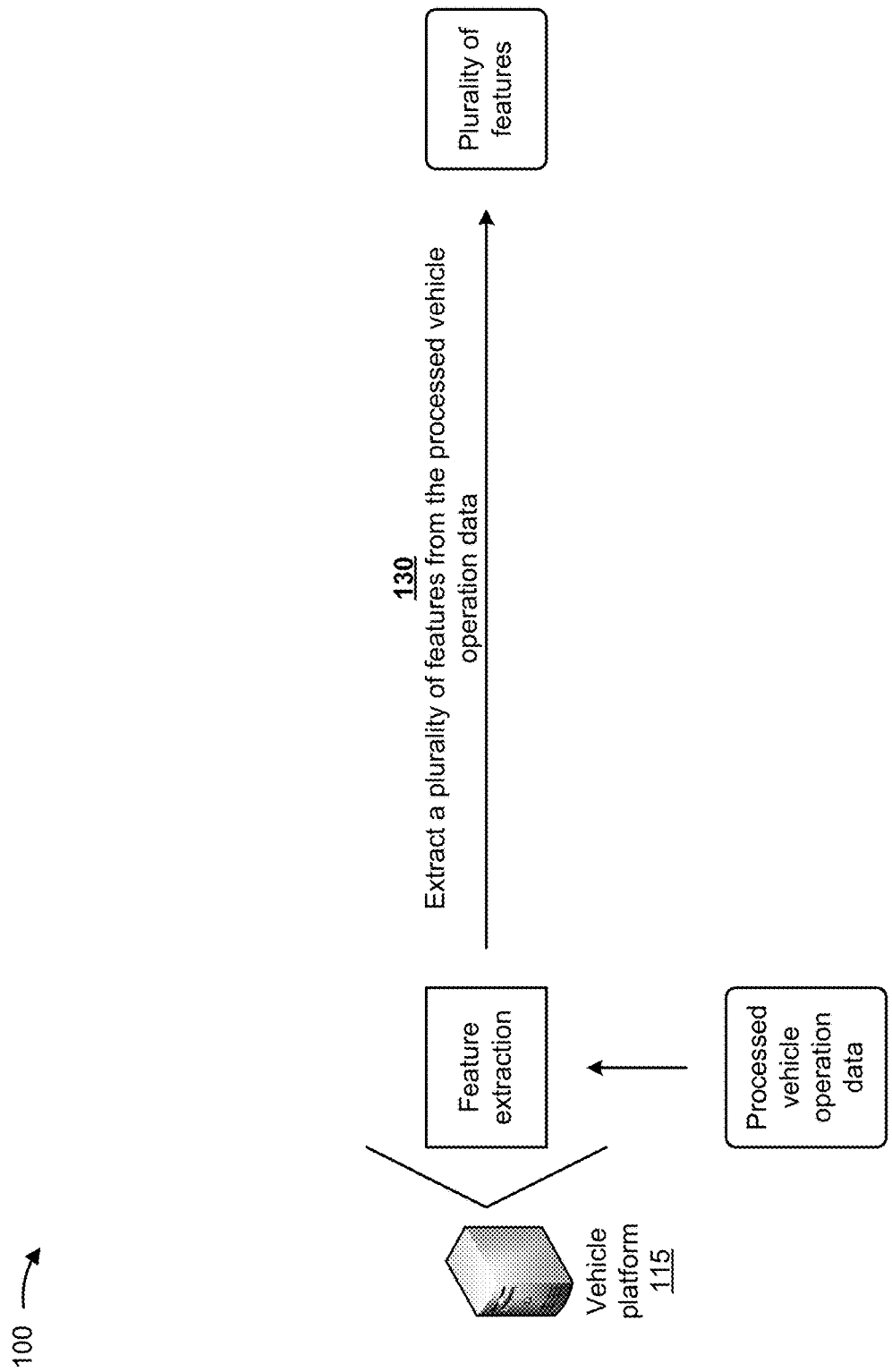

As shown in FIG. 1C, and by reference number 130, vehicle platform 115 may extract a plurality of features from the processed vehicle operation data. In some implementations, when extracting the plurality of features, vehicle platform 115 may compute, based on the processed vehicle operation data, a plurality of statistics that correspond to the plurality of features. For example, vehicle platform 115 may compute a value of a statistical variable for each input variable included in the processed vehicle operation data, and may extract a feature for each combination of a particular input variable and a different statistical variable associated with the particular input variable.

The statistical variables may include a mean variable, a variance variable, a standard deviation variable, a maximum variable, a minimum variable, a range variable, an interquartile range variable, a skewness variable, a kurtosis variable, a slope variable, a median variable, a twenty-fifth percentile variable, a seventy-fifth percentile variable, and/or the like. In one example, vehicle platform 115 may extract a feature associated with a mean of the x-axis raw acceleration, a feature associated with a variance of the x-axis raw acceleration, a feature associated with a standard deviation of the x-axis raw acceleration, and/or the like for all statistical variables associated with the x-axis raw acceleration. Vehicle platform 115 may extract a feature associated with a mean of the y-axis raw acceleration, a feature associated with a variance of the y-axis raw acceleration, a feature associated with a standard deviation of the y-axis raw acceleration, and/or the like for all statistical variables associated with the y-axis raw acceleration. In this way, vehicle platform 115 may extract a set of features based on commonly available and readily obtainable and/or determinable information and based on statistics that can be efficiently calculated without requiring a large amount of computing resources.

Figure 1D:
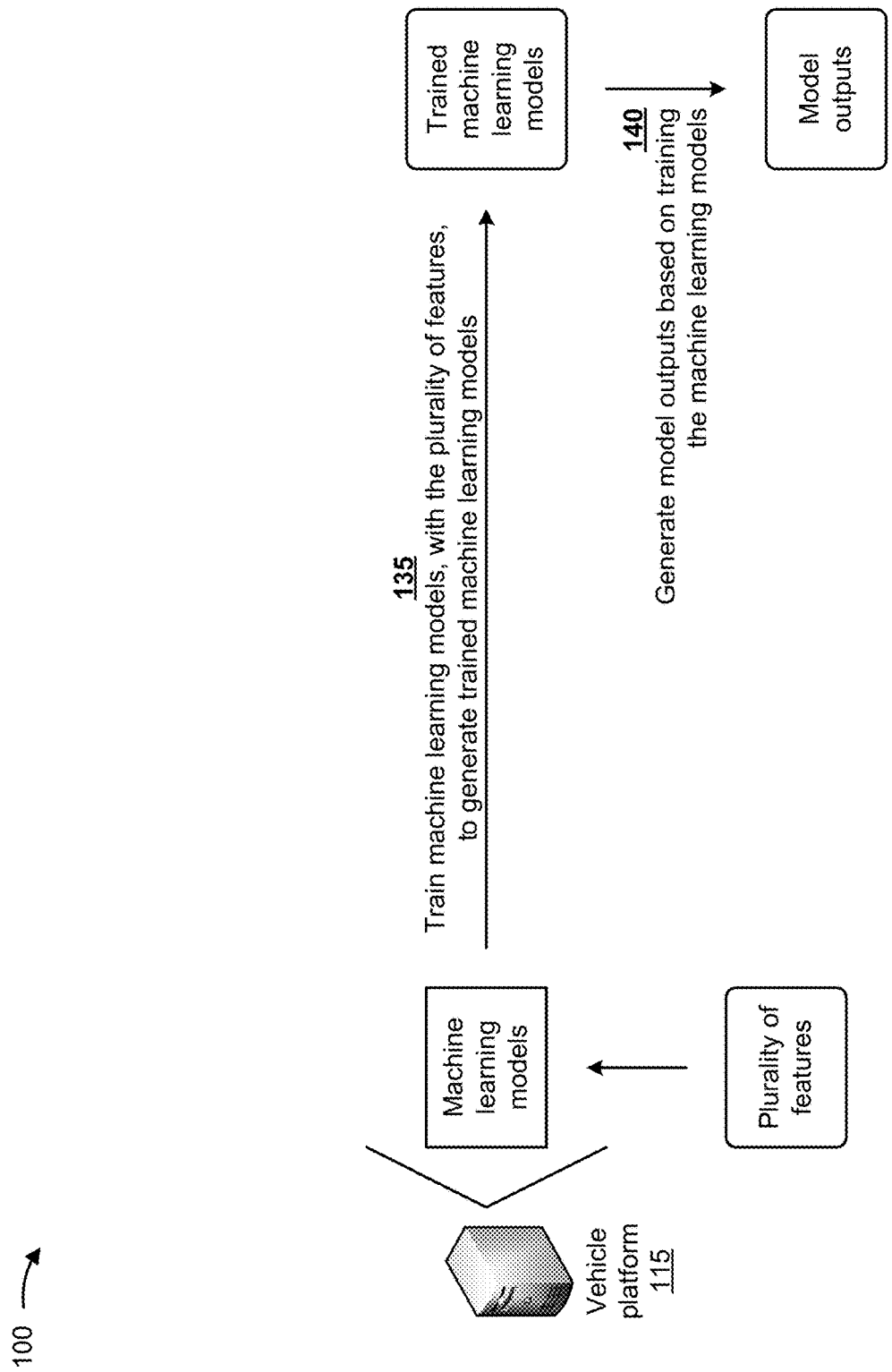

As shown in FIG. 1D, and by reference number 135, vehicle platform 115 may train machine learning models, with the plurality of features, to generate trained machine learning models. The trained machine learning models may generate indications of driving behaviors (e.g., normal driving behavior, reckless driving behavior, and/or the like) based on the features. In some implementations, when training the machine learning models with the plurality of features, vehicle platform 115 may utilize a nested cross-validation to tune a plurality of parameters for the machine learning models and to evaluate the machine learning models. Vehicle platform 115 may perform a preliminary analysis, with a first random forest model (e.g., a baseline random forest model), to tune the plurality of parameters, and may utilize a second random forest model (e.g., an evaluation random forest model) to classify the plurality of parameters and to generate the trained machine learning models. As further shown in FIG. 1D, and by reference number 140, vehicle platform 115 may generate model outputs based on training the machine learning models. The model outputs may include indications of reliabilities associated with the indications of driving behaviors.

When utilizing the nested cross-validation to tune the plurality of parameters for the machine learning models and to evaluate the machine learning models, vehicle platform 115 may employ a nested leave-one-out cross-validation for a driver, of a plurality of drivers, associated with the vehicle operation data. For example, the nested leave-one-out cross-validation may include an outer loop that generates multiple training and/or test splits by iteratively selecting data from one driver as a test set and selecting remaining data as a training set. Where d is the number of drivers, for each of the d splits, vehicle platform 115 may determine a reliability of data relative to the test driver, and may average the reliabilities to generate a test reliability. The nested leave-one-out cross-validation may include an inner loop that iterates over the drivers selected in the training set and generates training and/or validation splits. For each of the d−1 splits, vehicle platform 115 may determine reliabilities associated with the validation set, and may average scores of different splits of the inner loop to generate a validation accuracy.

In some implementations, the machine learning models may include random forest machine learning models. The random forest machine learning models may be utilized by vehicle platform 115 to determine whether a driver is exhibiting normal driving behavior or aggressive driving behavior based on vehicle operation data.

In some implementations, vehicle platform 115 may train the machine learning models, with historical feature information (e.g., information identifying the plurality of features), to determine indications of driving behavior. For example, vehicle platform 115 may separate the historical feature information into a training set, a validation set, a test set, and/or the like. The training set may be utilized to train the machine learning models. The validation set may be utilized to validate results of the trained machine learning models. The test set may be utilized to test operation of the machine learning models.

In some implementations, vehicle platform 115 may train the machine learning models using, for example, an unsupervised training procedure and based on the historical feature information. For example, vehicle platform 115 may perform dimensionality reduction to reduce the historical feature information to a minimum feature set, thereby reducing resources (e.g., processing resources, memory resources, and/or the like) to train the machine learning models, and may apply a classification technique to the minimum feature set.

In some implementations, vehicle platform 115 may use a logistic regression classification technique to determine a categorical outcome (e.g., that particular historical feature information indicates particular driving behaviors). Additionally, or alternatively, vehicle platform 115 may use a naïve Bayes classifier technique. In this case, vehicle platform 115 may perform binary recursive partitioning to split the historical feature information into partitions and/or branches and use the partitions and/or branches to determine outcomes (e.g., that particular historical feature information indicates particular driving behaviors). Based on using recursive partitioning, vehicle platform 115 may reduce utilization of computing resources relative to manual, linear sorting and analysis of data points, thereby enabling use of thousands, millions, or billions of data points to train the machine learning model, which may result in a more accurate model than using fewer data points.

Additionally, or alternatively, vehicle platform 115 may use a support vector machine (SVM) classifier technique to generate a non-linear boundary between data points in the training set. In this case, the non-linear boundary is used to classify test data into a particular class.

Additionally, or alternatively, vehicle platform 115 may train the machine learning models using a supervised training procedure that includes receiving input to the machine learning models from a subject matter expert, which may reduce an amount of time, an amount of processing resources, and/or the like to train the machine learning models relative to an unsupervised training procedure. In some implementations, vehicle platform 115 may use one or more other model training techniques, such as a neural network technique, a latent semantic indexing technique, and/or the like. For example, vehicle platform 115 may perform an artificial neural network processing technique (e.g., using a two-layer feedforward neural network architecture, a three-layer feedforward neural network architecture, and/or the like) to perform pattern recognition with regard to patterns of the historical feature information. In this case, using the artificial neural network processing technique may improve an accuracy of the trained machine learning models generated by vehicle platform 115 by being more robust to noisy, imprecise, or incomplete data, and by enabling vehicle platform 115 to detect patterns and/or trends undetectable to human analysts or systems using less complex techniques.

In some implementations, rather than training the machine learning models, vehicle platform 115 may receive a trained machine learning models from another device (e.g., a server device). For example, a server device may generate the trained machine learning models based on having trained machine learning models in a manner similar to that described above, and may provide the trained machine learning models to vehicle platform 115 (e.g., may pre-load vehicle platform 115 with the trained machine learning models, may receive a request from vehicle platform 115 for the trained machine learning models, and/or the like).

Figure 1E:
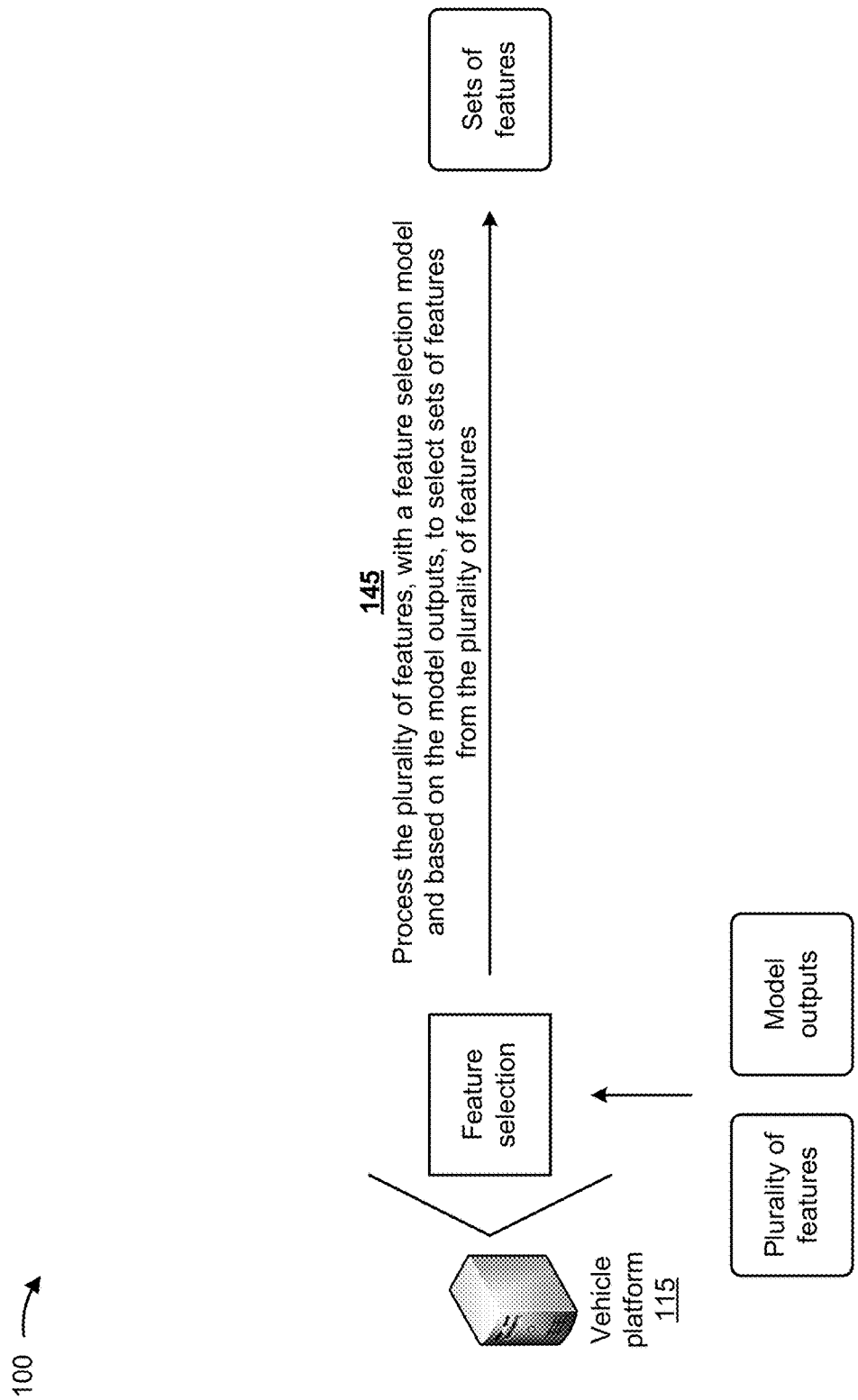

As shown in FIG. 1E, and by reference number 145, vehicle platform 115 may process the plurality of features, with a feature selection model and based on the model outputs, to select sets of features from the plurality of features. In some implementations, when processing the plurality of features, vehicle platform 115 may estimate an importance (e.g., a Gini importance) of each of the plurality of features, and may select the sets of features from the plurality of features based on the importance estimated for each of the plurality of features. For example, starting from a trained random forest model with a quantity (F) of trees, vehicle platform 115 may calculate a Gini importance (Imp) for a feature ($X_i$) as:

$$Imp(X_i) = \frac{1}{F}\sum_{t=1}^{F}\sum_{n\in\varphi_t} 1\{i \in s_n\}\left[\frac{N_n}{N}\Delta i(s_n, n)\right]$$

$$1\{i \in s_n\} = \begin{cases} 1 & \text{if } X_i \text{ selected by split } s_n \\ 0 & \text{otherwise} \end{cases}$$

where $\varphi_t$ may correspond to a set of nodes in a tree t, $N_n$ may correspond to a number of training samples that fall in a subtree of a node n, and N may correspond to a total number of samples. Given a Gini index ($i_G$):

$$i_G(n) = \sum_{k=1}^{C}\frac{N_{n_k}}{N_n}\left(1 - \frac{N_{n_k}}{N_n}\right)$$

an impurity decrease generated by split $s_n$ on a node n may be defined as:

$$\Delta i(s_n, n) = i_G(n) - \frac{N_{n_L}}{N_n}i_G(n_L) - \frac{N_{n_R}}{N_n}i_G(n_R)$$

where C may correspond to a number of classes, $N_{n_k}$ may correspond to a number of samples of a class k falling in a node n's subtree, $n_L$ and $n_R$ may correspond to, respectively, left and right children of the node n, and $N_{n_L}$ and $N_{n_R}$ may correspond to a number of training samples falling in left and right subtrees of the node n.

In some implementations, when processing the plurality of features, vehicle platform 115 may rank each of the plurality of features, based on an average Gini importance associated with each of the plurality of features, to generate rankings of the plurality of features. Vehicle platform 115 may filter the rankings of the plurality of features to generate filtered rankings of the plurality of features, and may determine validation accuracies associated with the plurality of features based on the filtered rankings of the plurality of features. Vehicle platform 115 may select the sets of features, from the plurality of features, based on the validation accuracies associated with plurality of features.

When filtering the rankings of the plurality of features, vehicle platform 115 may execute a filtering model to remove highly correlated variables as follows:

```
function FILTERRANKING (r, c)
    i ← 0
    while i <= len(r) do        ▷ iterate on the ranking
        top ← r[i]
        j ← i+1
        while j <= len(r) do
            other ← r[j]
            if Corr(top, other) > c then
                r ← r \ other
            else
                j ← j+1
    return r.
```

As shown above, the filtering model may begin with a feature ranked highest based on the Gini importance, as described above, and may remove all features that have a correlation (e.g., an absolute Pearson correlation) that exceeds a given threshold (c). The filtering model may select a next highest ranked feature from the remaining features, and may iterate the method until all features have been selected or filtered out. Vehicle platform 115 may re-rank the remaining features by training a first random forest model on the remaining features. In some implementations, vehicle platform 115 may assess several different values for the threshold c, each of which may generate a different filtered ranking.

Figure 1F:
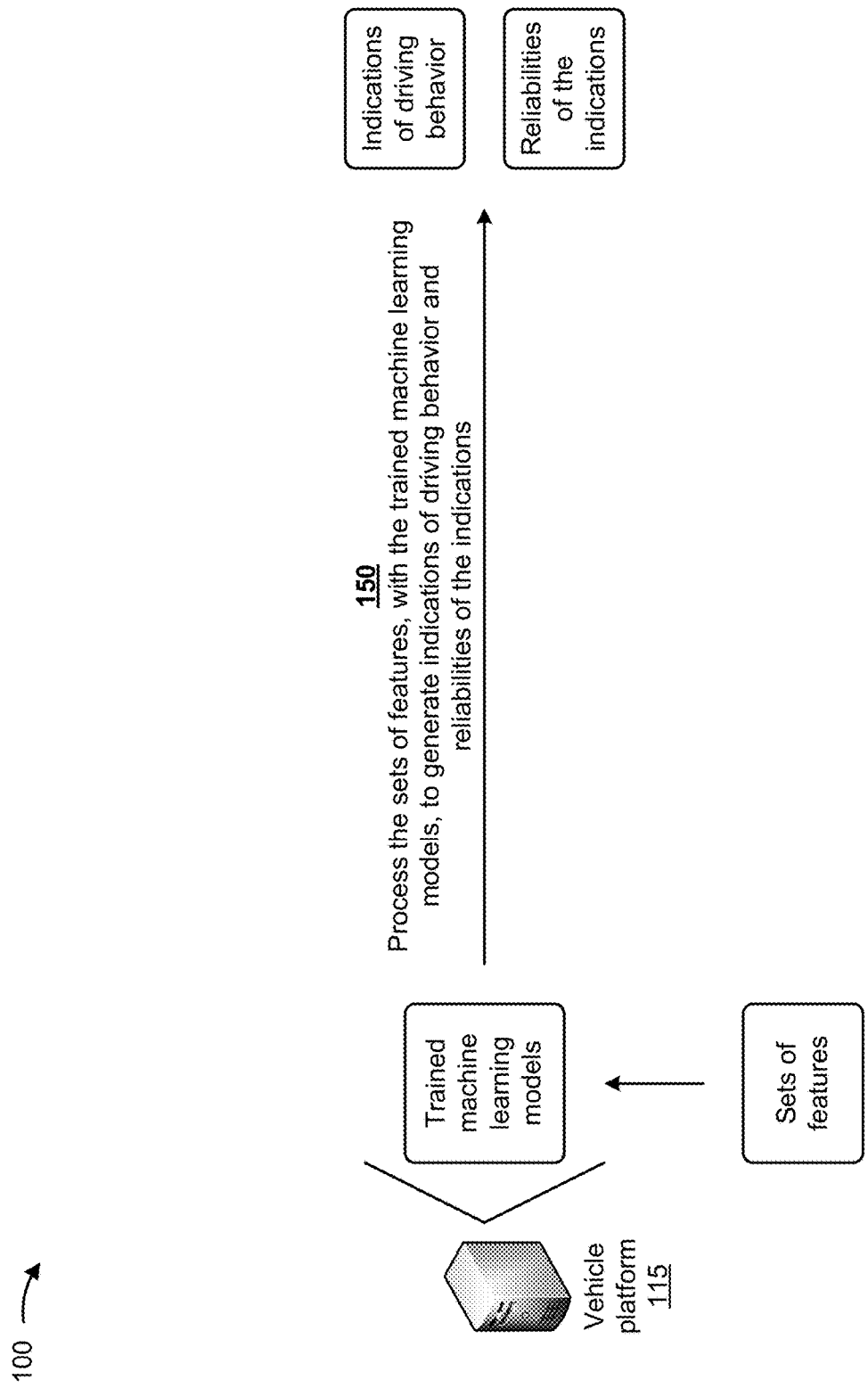

As shown in FIG. 1F, and by reference number 150, vehicle platform 115 may process the sets of features, with the trained machine learning models, to generate indications of driving behavior and reliabilities of the indications. In some implementations, each of the indications of driving behavior may include information identifying aggressive driving behavior, information identifying normal driving behavior, information identifying drowsy driving behavior, information identifying performance driving behavior, information identifying economical driving behavior, and/or the like. In some implementations, vehicle platform 115 may train a second random forest model based on different subsets of features. For example, vehicle platform 115 may begin with a feature ranked highest based on the Gini importance, as described above, and may incrementally add features in decreasing order of importance. At each increment, vehicle platform 115 may train the second random forest model, may utilize tuning parameters with the second random forest model, and may evaluate a reliability of the second random forest model based on independent data via cross-validation, as described above.

As shown in FIG. 1G, and by reference number 155, vehicle platform 115 may select a set of features, from the sets of features, based on the indications of driving behavior and the reliabilities of the indications. In some implementations, vehicle platform 115 may utilize a feature selection model to select the set of features from the sets of features. For example, given the plurality of features and a set of filtering thresholds (cSet), the feature selection model may perform the following steps:

```
procedure FEATURESELECTION (allFeatures, cSet)
    ref Ranking, _ ← train (baseRF, allFeatures)
    reliabilities ← ∅
    for c in cSet do
        fr ← FILTERRANKING (refRanking, c)
        filteredRanking, _ ← train(baseRF, fr)
        features ← ∅
        reliabilities_c ← ∅
        for f in filteredRanking do
            features ← features ∪ f
            _, a ← train(evalRF, features)
            reliabilities_c ← reliabilities_c ∪ a
    reliabilities ← reliabilities ∪ reliabilities_c
    return (features, reliabilities)
``` where baseRF may correspond to a first (e.g., a baseline) random forest model and evalRF may correspond to a second (e.g., an evaluation) random forest model. The train(•) function may train a specified random forest model based on a particular set of features (e.g. allFeatures) and may return a ranking of input features and a validation accuracy.

In one example, vehicle platform 115 may utilize features based on combinations of the input variables and the statistical variables, as described above, and may select a particular quantity (e.g., three, six, and/or the like) of features, such as a standard deviation of a z-axis, a mean of a vehicle speed, a skewness of a y-axis filtered acceleration, and/or the like. The selected features may be representative of discriminative driving characteristics. For example, the standard deviation of the z-axis (e.g., a longitudinal acceleration) may indicate extreme braking and accelerations, the mean of the vehicle speed (e.g., an average speed) may be associated with a tendency of speeding, and the skewness of y-axis filtered acceleration (e.g., a lateral acceleration) may indicate harsh cornering in curves and turns. In this way, vehicle platform 115 may select a quantity of features that may be determined by a device with limited computing power, such as by user device 105 and/or a computing device associated with vehicle 110.

Figure 1H:
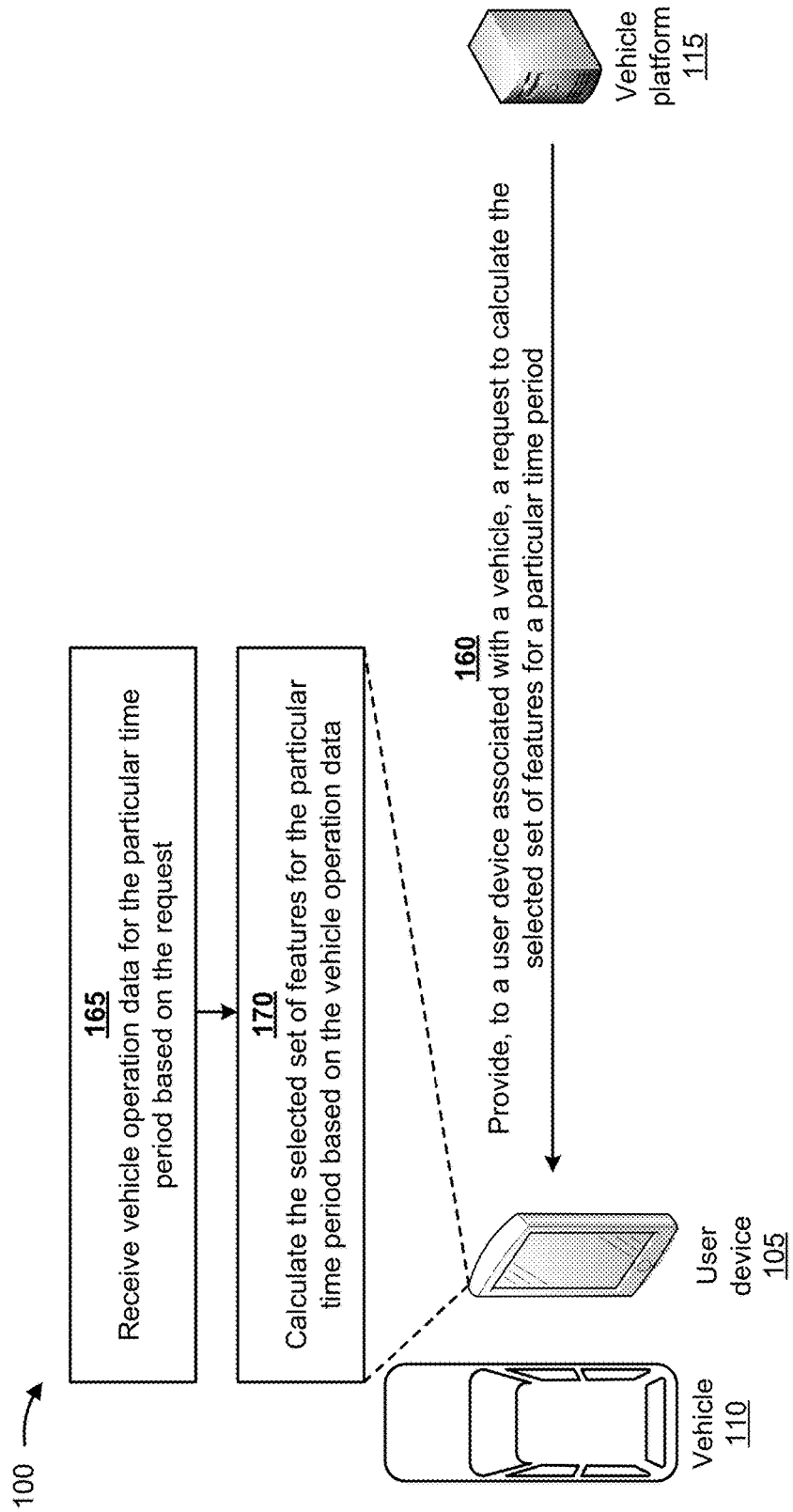

As shown in FIG. 1H, and by reference number 160, vehicle platform 115 may provide, to user device 105 associated with vehicle 110, a request to calculate the selected set of features for a particular time period. The particular time period may be time period measured in seconds (e.g., ten seconds, thirty seconds, sixty seconds, and/or the like), in minutes (e.g., two minutes, five minutes, and/or the like), and/or the like. As further shown in FIG. 1H, and by reference number 165, user device 105 may receive vehicle operation data, from vehicle 110 and/or sensors associated with vehicle 110, for the particular time period and based on the request. For example, user device 105 may calculate the vehicle operation data (e.g., based on sensors associated with user device 105) and/or may receive the vehicle operation data from a inertial measurement unit associated with vehicle 110, from a three-axis accelerometer associated with vehicle 110, from a GPS device associated with vehicle 110, from an ECM associated with vehicle 110, from video cameras associated with vehicle 110, and/or the like.

In some implementations, the selected set of features may be different for different vehicles 110 and/or based on conditions associated with the different vehicles 110. For example, a vehicle 110 may not include a device that is capable of capturing the vehicle operation data required to determine the set of features. In such an example, vehicle platform 115 may receive an indication of vehicle operation data that is available to vehicle 110 and may determine a particular set of features based on the available vehicle operation data. Other factors may influence selection of the set of features, such as a type of vehicle 110 calculating the set of features (e.g., a truck, a car, a motorcycle, and/or the like); a location of vehicle 110 (e.g., a highway, a city road, a country road, and/or the like); environmental conditions associated with vehicle (e.g., sunny, rainy, snowy, icy, and/or the like); and/or the like. In some implementations, vehicle platform 115 may receive information identifying one or more of the other factors and may determine a particular set of features based on the one or more of the other factors.

With reference to FIG. 1H, vehicle platform 115 may then provide, to user device 105, a request to calculate the particular set of features for the particular time period.

As further shown in FIG. 1H, and by reference number 170, user device 105 may calculate the selected set of features for the particular time period based on the vehicle operation data. Alternatively, or additionally, user device 105 may automatically calculate the selected set of features on a periodic basis (e.g., every quantity of seconds) and may continuously and periodically provide the calculated set of features to vehicle platform 115 in near real-time relative to calculating the selected set of features.

Figure 1I:
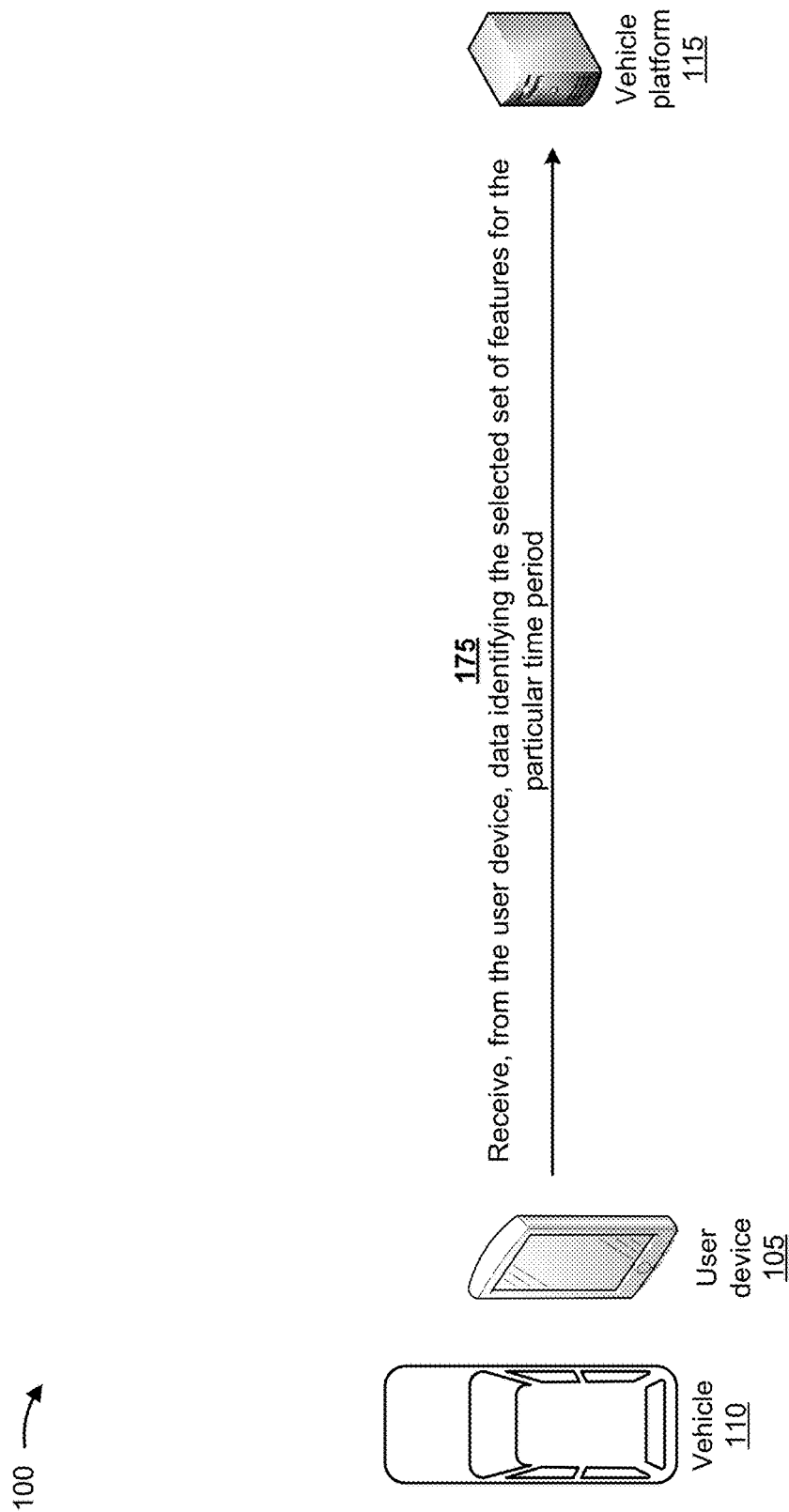

As shown in FIG. 1I, and by reference number 175, vehicle platform 115 may receive, from user device 105, data identifying the selected set of features for the particular time period. In some implementations, vehicle platform 115 may receive a single data point for each feature of the selected set of features over the particular time period. Alternatively, or additionally, vehicle platform 115 may continuously and periodically receive data points for each feature of the selected set of features when such features are provided on a periodic basis.

Figure 1J:
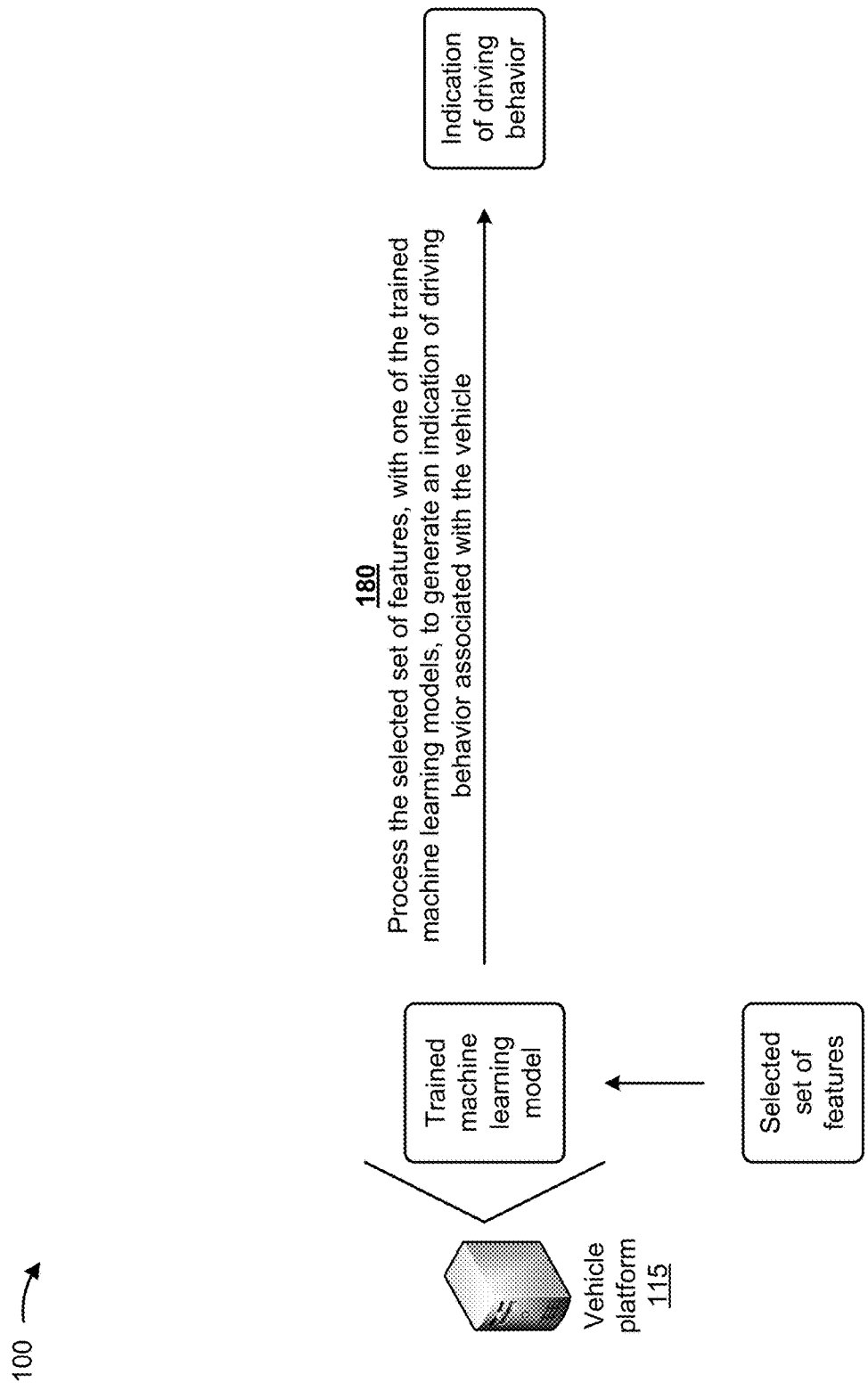

As shown in FIG. 1J, and by reference number 180, vehicle platform 115 may process the selected set of features, with one or more of the trained machine learning models, to generate an indication of driving behavior associated with vehicle 110 (e.g., a drive of vehicle 110). In this way, vehicle platform 115 may distinguish between safe or normal driving behavior and aggressive driving behavior while using only a limited set of selected features. The limited set of features may be calculated with limited computing resources (e.g., by user device 105 and/or by devices of vehicle 110) to provide an effective and accurate indication of driving behavior. This may reduce computations and communications required to determine driving behavior associated with vehicle 110, which may conserve computing resources, communication resources, networking resources, and/or the like that would otherwise be wasted in capturing all available vehicle operation data, transmitting the vehicle operation data, storing the vehicle operation data, and/or the like.

As shown in FIG. 1K, and by reference number 185, vehicle platform 115 may perform one or more actions based on the indication of driving behavior. In some implementations, the one or more actions may include vehicle platform 115 providing, to user device 105, the indication of driving behavior associated with vehicle 110. For example, vehicle platform 115 may provide the indication for display on user device 105 or on another device associated with vehicle 110; may provide the indication for display to a driver of vehicle 110, to an employer of the driver, to an owner of vehicle 110, and/or the like. In this way, vehicle platform 115 may enable the user of user device 105, the driver of vehicle 110, an employer of the driver, a parent of the driver, and/or the like, to be aware of adverse driving behavior. This may enable the driver to effectively adjust and/or improve driving techniques, which may improve road safety, conserve fuel, conserve resources that would otherwise be wasted policing poor driving behavior, handling vehicle accidents, and/or the like.

In some implementations, the one or more actions may include vehicle platform 115 providing the indication of driving behavior to a device associated with an insurer of vehicle 110. In this way, vehicle platform 115 may enable the insurer to adjust coverage and/or cost of coverage associated with vehicle 110, an owner of vehicle 110, a driver of vehicle 110, and/or the like. The insurer may provide guidance and/or training to the driver of vehicle 110 (e.g., in exchange for not increasing coverage costs) in order to reduce risks of accidents, tickets, and/or the like, which may improve road safety, conserve fuel, conserve resources that would otherwise be wasted handling insurance claims, policing poor driving behavior, handling vehicle accidents, and/or the like.

In some implementations, the one or more actions may include vehicle platform 115 providing, to user device 105, an instruction to address the driving behavior. For example, vehicle platform 115 may instruct the driver of vehicle 110 (e.g., in near real-time) to adjust a driving speed, to stop making reckless turns, and/or the like. In this way, vehicle platform 115 may enable the driver of vehicle 110 to perform corrective driving actions based on the indication of driving behavior associated with vehicle 110, which may improve road safety, conserve fuel, conserve resources that would otherwise be wasted policing poor driving behavior, handling vehicle accidents, and/or the like.

In some implementations, the one or more actions may include vehicle platform 115 causing vehicle 110 to be disabled or the speed of vehicle 110 to be reduced to a speed limit based on the indication of driving behavior (e.g., that the driver was speeding). In this way, vehicle platform 115 may prevent vehicle 110 from being operated in a dangerous manner that risks death or injury (e.g., to the driver of vehicle 110, passengers of vehicle 110, other drivers, and/or the like), that risks damage to property (e.g., damage to vehicle 110, damage to other vehicles, damage to physical property, and/or the like), and/or the like. This may conserve resources that would otherwise be wasted in treating injuries, repairing damage, handling vehicle accidents, handling legal actions, and/or the like.

In some implementations, the one or more actions may include vehicle platform 115 determining a driver risk score based on the indication of driving behavior. In this way, vehicle platform 115 may enable a driver of vehicle 110, an employer of the driver, an owner of vehicle 110, and/or the like to monitor quality and assess risk associated with the driver and/or operation of vehicle 110; to be aware of changes to driving behavior associated with vehicle 110; to provide an objective and consistent mechanism for evaluating driver performance, rewarding good driver performance, addressing bad driver performance, etc.; and/or the like.

In some implementations, the one or more actions may include vehicle platform 115 retraining the machine learning models based on the indication of driving behavior. In this way, vehicle platform 115 may improve the accuracy of the machine learning models in determining indications of driving behaviors, reliabilities of the indications, and/or the like, which may improve speed and efficiency of the machine learning models and conserve computing resources, network resources, and/or the like.

In some implementations, the one or more actions may include vehicle platform 115 causing a driver training program, focused on the driving behavior, to be scheduled for the driver of vehicle 110. In this way, vehicle platform 115 may automatically arrange and/or facilitate training that may improve driving behavior, without requiring manual administrative actions or other resources to arrange for and/or facilitate the driver training program. This may conserve resources that would otherwise be wasted treating injuries, repairing damage, handling vehicle accidents, handling legal actions, and/or the like caused by the driving behavior.

In some implementations, the one or more actions may include vehicle platform 115 causing vehicle 110 to operate in an autonomous mode until the driver of the particular vehicle completes particular training. For example, vehicle 110 may include an autonomous mode, and vehicle platform 115 may cause the autonomous mode to be engaged, and prevent the drive from operating vehicle 110 until receiving an indication that the driver has completed the particular training. In this way, vehicle platform 115 may conserve resources that would otherwise be wasted treating injuries, repairing damage, handling vehicle accidents, handling legal actions, and/or the like caused by the driver.

In this way, several different stages of the process for classifying driving behavior is automated via machine learning and feature selection, which may remove human subjectivity and waste from the process, and which may improve speed and efficiency of the process and conserve computing resources (e.g., processing resources, memory resources, and/or the like), communication resources, networking resources, and/or the like. Furthermore, implementations described herein use a rigorous, computerized process to perform tasks or roles that were not previously performed or were previously performed using subjective human intuition or input. For example, currently there does not exist a technique that utilizes machine learning and feature selection to classify driving behavior. Finally, the process for classifying driving behavior conserves computing resources, communication resources, networking resources, and/or the like that would otherwise be wasted in capturing all available vehicle operation data, transmitting the vehicle operation data, storing the vehicle operation data, and/or the like.

As indicated above, FIGS. 1A-1K are provided merely as examples. Other examples may differ from what was described with regard to FIGS. 1A-1K. The number and arrangement of devices and networks shown in FIGS. 1A-1K are provided as an example. In practice, there may be additional devices and/or networks, fewer devices and/or networks, different devices and/or networks, or differently arranged devices and/or networks than those shown in FIGS. 1A-1K. Furthermore, two or more devices shown in FIGS. 1A-1K may be implemented within a single device, or a single device shown in FIGS. 1A-1K may be implemented as multiple, distributed devices. Additionally, or alternatively, a set of devices (e.g., one or more devices) of FIGS. 1A-1K may perform one or more functions described as being performed by another set of devices of FIGS. 1A-1K.

Figure 2:
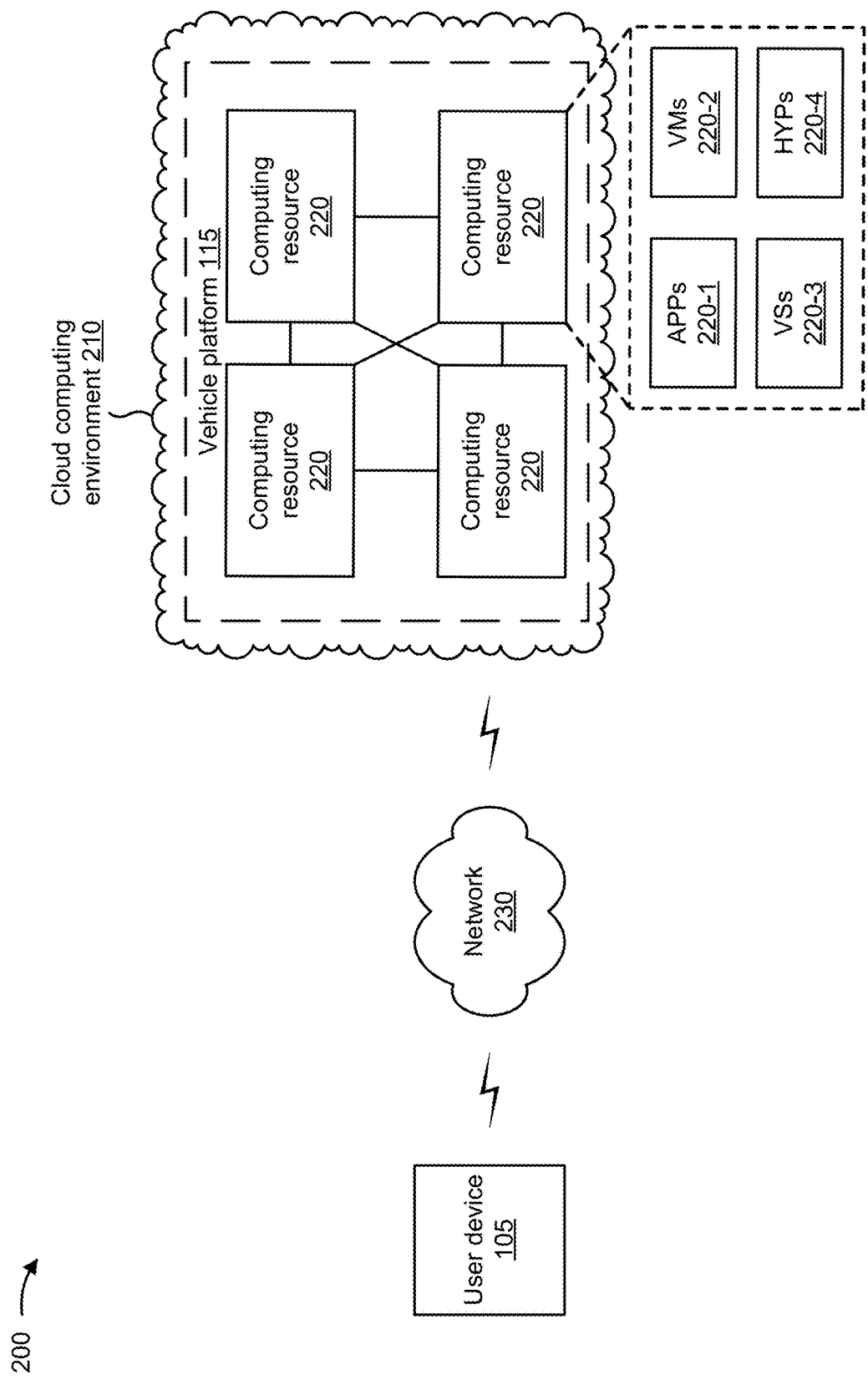
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include user device 105, a vehicle platform 115, and a network 230. Devices of environment 200 may interconnect via wired connections, wireless connections, or a combination of wired and wireless connections.

User device 105 includes one or more devices capable of receiving, generating, storing, processing, and/or providing information, such as information described herein. For example, user device 105 may include a mobile phone (e.g., a smart phone, a radiotelephone, etc.), a laptop computer, a tablet computer, a desktop computer, a handheld computer, a gaming device, a wearable communication device (e.g., a smart watch, a pair of smart glasses, a heart rate monitor, a fitness tracker, smart clothing, smart jewelry, a head mounted display, etc.), a GPS device, a device included in vehicle 110 (e.g., an inertial measurement unit, a three-axis accelerometer, a GPS device, an ECM, a video camera, and/or the like) or a similar type of device. In some implementations, user device 105 may receive information from and/or transmit information to vehicle platform 115.

Vehicle platform 115 includes one or more devices that utilize machine learning and feature selection to classify driving behavior. In some implementations, vehicle platform 115 may be designed to be modular such that certain software components may be swapped in or out depending on a particular need. As such, vehicle platform 115 may be easily and/or quickly reconfigured for different uses. In some implementations, vehicle platform 115 may receive information from and/or transmit information to one or more user devices 105.

In some implementations, as shown, vehicle platform 115 may be hosted in a cloud computing environment 210. Notably, while implementations described herein describe vehicle platform 115 as being hosted in cloud computing environment 210, in some implementations, vehicle platform 115 may not be cloud-based (i.e., may be implemented outside of a cloud computing environment) or may be partially cloud-based.

Cloud computing environment 210 includes an environment that hosts vehicle platform 115. Cloud computing environment 210 may provide computation, software, data access, storage, etc., services that do not require end-user knowledge of a physical location and configuration of system(s) and/or device(s) that hosts vehicle platform 115. As shown, cloud computing environment 210 may include a group of computing resources 220 (referred to collectively as "computing resources 220" and individually as "computing resource 220").

Computing resource 220 includes one or more personal computers, workstation computers, mainframe devices, or other types of computation and/or communication devices. In some implementations, computing resource 220 may host vehicle platform 115. The cloud resources may include compute instances executing in computing resource 220, storage devices provided in computing resource 220, data transfer devices provided by computing resource 220, etc. In some implementations, computing resource 220 may communicate with other computing resources 220 via wired connections, wireless connections, or a combination of wired and wireless connections.

As further shown in FIG. 2, computing resource 220 includes a group of cloud resources, such as one or more applications ("APPs") 220-1, one or more virtual machines ("VMs") 220-2, virtualized storage ("VSs") 220-3, one or more hypervisors ("HYPs") 220-4, and/or the like.

Application 220-1 includes one or more software applications that may be provided to or accessed by user device 105. Application 220-1 may eliminate a need to install and execute the software applications on user device 105. For example, application 220-1 may include software associated with vehicle platform 115 and/or any other software capable of being provided via cloud computing environment 210. In some implementations, one application 220-1 may send/receive information to/from one or more other applications 220-1, via virtual machine 220-2.

Virtual machine 220-2 includes a software implementation of a machine (e.g., a computer) that executes programs like a physical machine. Virtual machine 220-2 may be either a system virtual machine or a process virtual machine, depending upon use and degree of correspondence to any real machine by virtual machine 220-2. A system virtual machine may provide a complete system platform that supports execution of a complete operating system ("OS"). A process virtual machine may execute a single program and may support a single process. In some implementations, virtual machine 220-2 may execute on behalf of a user (e.g., a user of user device 105 or an operator of vehicle platform 115), and may manage infrastructure of cloud computing environment 210, such as data management, synchronization, or long-duration data transfers.

Virtualized storage 220-3 includes one or more storage systems and/or one or more devices that use virtualization techniques within the storage systems or devices of computing resource 220. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 220-4 may provide hardware virtualization techniques that allow multiple operating systems (e.g., "guest operating systems") to execute concurrently on a host computer, such as computing resource 220. Hypervisor 220-4 may present a virtual operating platform to the guest operating systems and may manage the execution of the guest operating systems. Multiple instances of a variety of operating systems may share virtualized hardware resources.

Network 230 includes one or more wired and/or wireless networks. For example, network 230 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
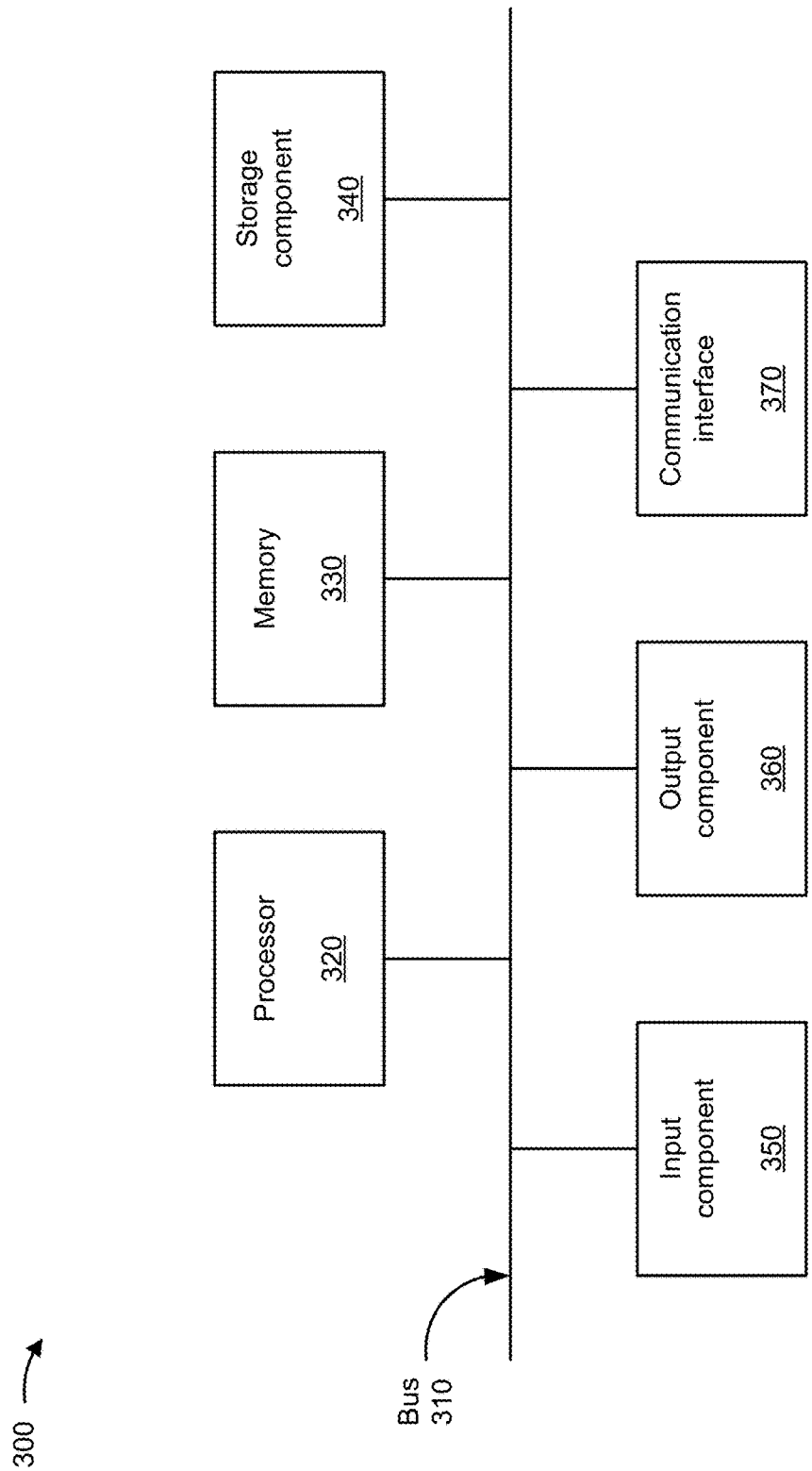
FIG. 3 is a diagram of example components of one or more devices of FIG. 2.

FIG. 3 is a diagram of example components of a device 300. Device 300 may correspond to user device 105, vehicle platform 115, and/or computing resource 220. In some implementations, user device 105, vehicle platform 115, and/or computing resource 220 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random-access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid-state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flow chart of an example process 400 for utilizing machine learning and feature selection to classify driving behavior. In some implementations, one or more process blocks of FIG. 4 may be performed by a device (e.g., vehicle platform 115). In some implementations, one or more process blocks of FIG. 4 may be performed by another device or a group of devices separate from or including the device, such as a user device (e.g., user device 105).

As shown in FIG. 4, process 400 may include receiving vehicle operation data associated with operation of a plurality of vehicles (block 410). For example, the device (e.g., using computing resource 220, processor 320, communication interface 370, and/or the like) may receive vehicle operation data associated with operation of a plurality of vehicles, as described above. The vehicle operation data may include data identifying accelerations of the plurality of vehicles, speeds of the plurality of vehicles, distances of the plurality of vehicles from other vehicles, pedal positions of the plurality of vehicles, steering angles of the plurality of vehicles, engine revolutions-per-minute of the plurality of vehicles, and/or the like. The vehicle operation data may be received from user devices associated with the plurality of vehicles, inertial measurement units associated with the plurality of vehicles, three-axis accelerometers associated with the plurality of vehicles, global positioning system (GPS) devices associated with the plurality of vehicles, engine control modules associated with the plurality of vehicles, video cameras associated with the plurality of vehicles, and/or the like.

As further shown in FIG. 4, process 400 may include processing the vehicle operation data to generate processed vehicle operation data for a particular time period (block 420). For example, the device (e.g., using computing resource 220, processor 320, memory 330, and/or the like) may process the vehicle operation data to generate processed vehicle operation data for a particular time period, as described above. In some implementations, processing the vehicle operation data to generate the processed vehicle operation data may include process 400 applying a moving average, based on the particular time period, to the vehicle operation data to generate a low-pass version of the vehicle operation data; and adding the low-pass version of the vehicle operation data to the vehicle operation data to generate the processed vehicle operation data.

As further shown in FIG. 4, process 400 may include extracting a plurality of features from the processed vehicle operation data (block 430). For example, the device (e.g., using computing resource 220, processor 320, storage component 340, and/or the like) may extract a plurality of features from the processed vehicle operation data, as described above. In some implementations, extracting the plurality of features from the processed vehicle operation data may include process 400 computing a plurality of statistics based on the processed vehicle operation data.

As further shown in FIG. 4, process 400 may include training machine learning models, with the plurality of features, to generate trained machine learning models (block 440). For example, the device (e.g., using computing resource 220, processor 320, memory 330, and/or the like) may train machine learning models, with the plurality of features, to generate trained machine learning models, as described above. In some implementations, training the machine learning models with the plurality of features may include process 400 utilizing a nested cross-validation to tune the plurality of features for the machine learning models and to evaluate the machine learning models; performing a preliminary analysis, with a first random forest model, to tune the plurality of features; and utilizing a second random forest model to classify the plurality of features and to generate the trained machine learning models. Each of the machine learning models may include a random forest machine learning model.

As further shown in FIG. 4, process 400 may include generating model outputs based on training the machine learning models (block 450). For example, the device (e.g., using computing resource 220, processor 320, storage component 340, input component 350, output component 360, communication interface 370, and/or the like) may generate model outputs based on training the machine learning models, as described above.

As further shown in FIG. 4, process 400 may include processing the plurality of features, with a feature selection model and based on the model outputs, to select sets of features from the plurality of features (block 460). For example, the device (e.g., using computing resource 220, processor 320, memory 330, storage component 340, and/or the like) may process the plurality of features, with a feature selection model and based on the model outputs, to select sets of features from the plurality of features, as described above. In some implementations, processing the plurality of features, with the feature selection model and based on the model outputs, to select the sets of features, may include process 400 estimating an importance of each of the plurality of features based on an average Gini importance associated with each of the plurality of features; and selecting the sets of features from the plurality of features based on the importance estimated for each of the plurality of features.

In some implementations, processing the plurality of features, with the feature selection model and based on the model outputs, to select the sets of features, may include process 400 ranking each of the plurality of features based on an average Gini importance associated with each of the plurality of features to generate rankings of the plurality of features; filtering the rankings of the plurality of features to generate filtered rankings of the plurality of features; determining validation accuracies associated with plurality of features based on the filtered rankings of the plurality of features; and selecting the sets of features, from the plurality of features, based on the validation accuracies associated with plurality of features.

As further shown in FIG. 4, process 400 may include processing the sets of features, with the trained machine learning models, to generate indications of driving behavior and reliabilities of the indications of driving behavior (block 470). For example, the device (e.g., using computing resource 220, processor 320, memory 330, and/or the like) may process the sets of features, with the trained machine learning models, to generate indications of driving behavior and reliabilities of the indications of driving behavior, as described above. Each of the indications of driving behavior includes information identifying one of aggressive driving behavior or normal driving behavior.

As further shown in FIG. 4, process 400 may include selecting a set of features, from the sets of features, based on the indications of driving behavior and the reliabilities of the indications of driving behavior, wherein a user device associated with a particular vehicle is capable of calculating the set of features for the particular time period (block 480). For example, the device (e.g., using computing resource 220, processor 320, storage component 340, and/or the like) may select a set of features, from the sets of features, based on the indications of driving behavior and the reliabilities of the indications of driving behavior, as described above. In some implementations, a user device associated with a particular vehicle may be capable of calculating the set of features for the particular time period.

Process 400 may include additional implementations, such as any single implementation or any combination of implementations described below and/or in connection with one or more other processes described elsewhere herein.

In some implementations, process 400 may further include providing, to the user device, a request to calculate the set of features for the particular time period, where the user device is capable of calculating the set of features for the particular time period and for the particular vehicle based on the request; receiving, from the user device, data identifying the set of features for the particular time period; and processing data identifying the set of features, with one of the trained machine learning models, to generate an indication of driving behavior associated with the particular vehicle.

In some implementations, process 400 may further include performing one or more actions based on the indication of driving behavior associated with the particular vehicle. The one or more actions may include providing, to the user device, the indication of driving behavior associated with the particular vehicle; providing the indication of driving behavior to a particular device associated with an insurer of the particular vehicle; providing, to the user device, an instruction to address the driving behavior; causing the particular vehicle to be disabled based on the indication of driving behavior; determining a driver risk score, for a driver of the particular vehicle, based on the indication of driving behavior; retraining at least one of the machine learning models based on the indication of driving behavior; causing a driver training program, focused the driving behavior, to be scheduled for the driver of the particular vehicle; causing the particular vehicle to operate in an autonomous mode until the driver of the particular vehicle completes particular training; and/or the like.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

A user interface may include a graphical user interface, a non-graphical user interface, a text-based user interface, and/or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:
1. A method, comprising:
receiving, by a device, vehicle operation data associated with operation of a plurality of vehicles;
processing, by the device, the vehicle operation data to generate processed vehicle operation data for a first time period;

extracting, by the device, a plurality of features from the processed vehicle operation data;

training, by the device, machine learning models, with the plurality of features, to generate trained machine learning models;

generating, by the device, model outputs based on training the machine learning models;

processing, by the device, the plurality of features, with a feature selection model and based on the model outputs, to select sets of features from the plurality of features;

processing, by the device, the sets of features, with the trained machine learning models, to generate first indications of driving behavior and reliabilities of the first indications of driving behavior;

selecting, by the device, a set of features, from the sets of features, based on the first indications of driving behavior and the reliabilities of the first indications of driving behavior;

providing, by the device and to a user device associated with a particular vehicle, a request to calculate the selected set of features for a second time period,
wherein the vehicle operation data is received, by the user device, from the particular vehicle based on the request, for the second time period;

receiving, by the device and from the user device, data identifying the selected set of features for the second time period; and processing, by the device, the data identifying the selected set of features to generate a second indication of driving behavior associated with the particular vehicle.

2. The method of claim 1, further comprising:
performing one or more actions based on the second indication of driving behavior associated with the particular vehicle.

3. The method of claim 1, further comprising one or more of:
providing, to the user device, the second indication of driving behavior associated with the particular vehicle;
providing the second indication of driving behavior associated with the particular vehicle to a particular device associated with an insurer of the particular vehicle;
providing, to the user device, an instruction to address driving behavior based on the second indication of driving behavior associated with the particular vehicle;
causing the particular vehicle to be disabled based on the second indication of driving behavior associated with the particular vehicle;
determining a driver risk score, for a driver of the particular vehicle, based on the second indication of driving behavior associated with the particular vehicle; or
retraining at least one of the machine learning models based on the second indication of driving behavior associated with the particular vehicle.

4. The method of claim 1, wherein each of the first indications of driving behavior includes information identifying one of:
aggressive driving behavior, or
normal driving behavior.

5. The method of claim 1, wherein processing the vehicle operation data to generate the processed vehicle operation data comprises:
applying a moving average, based on the first time period, to the vehicle operation data to generate a low-pass version of the vehicle operation data; and
adding the low-pass version of the vehicle operation data to the vehicle operation data to generate the processed vehicle operation data.

6. The method of claim 1, wherein extracting the plurality of features from the processed vehicle operation data comprises:
computing a plurality of statistics based on the processed vehicle operation data,
wherein the plurality of statistics correspond to the plurality of features.

7. A device, comprising:
one or more memories; and
one or more processors, communicatively coupled to the one or more memories, configured to:
receive vehicle operation data associated with operation of a plurality of vehicles;
process the vehicle operation data to generate processed vehicle operation data for a first time period;
extract a plurality of features from the processed vehicle operation data;
train machine learning models, with the plurality of features, to generate trained machine learning models,
wherein training the machine learning models generates model outputs;
process the plurality of features, with a feature selection model and based on the model outputs, to select sets of features from the plurality of features;
process the sets of features, with the trained machine learning models, to generate first indications of driving behavior and reliabilities of the first indications of driving behavior;
select a set of features, from the sets of features, based on the first indications of driving behavior and the reliabilities of the first indications of driving behavior;
provide, to a user device associated with a particular vehicle, a request to calculate the selected set of features for a second time period,
wherein vehicle operation data of the particular vehicle is received, by the user device, from the particular vehicle based on the request, for the second time period;
receive, from the user device, data identifying the selected set of features for the second time period; and
determine a second indication of driving behavior associated with the particular vehicle based on the data identifying the selected set of features.

8. The device of claim 7, wherein the one or more processors, when training the machine learning models with the plurality of features, are configured to:
utilize a nested cross-validation to tune the plurality of features for the machine learning models and to evaluate the machine learning models;
perform a preliminary analysis, with a first random forest model, to tune the plurality of features; and
utilize a second random forest model to classify the plurality of features and to generate the trained machine learning models.

9. The device of claim 7, wherein the one or more processors, when processing the plurality of features, with the feature selection model and based on the model outputs, to select the sets of features, are configured to:
estimate an importance of each of the plurality of features based on an average Gini importance associated with each of the plurality of features; and select the sets of features from the plurality of features based on the importance estimated for each of the plurality of features.

10. The device of claim 7, wherein the one or more processors, when processing the plurality of features, with the feature selection model and based on the model outputs, to select the sets of features, are configured to:
rank each of the plurality of features based on an average Gini importance associated with each of the plurality of features to generate rankings of the plurality of features;
filter the rankings of the plurality of features to generate filtered rankings of the plurality of features;
determine validation accuracies associated with the plurality of features based on the filtered rankings of the plurality of features; and
select the sets of features, from the plurality of features, based on the validation accuracies associated with plurality of features.

11. The device of claim 7, wherein each of the machine learning models includes a random forest machine learning model.

12. The device of claim 7, wherein the vehicle operation data associated with the plurality of vehicles includes data identifying one or more of:
accelerations of the plurality of vehicles,
speeds of the plurality of vehicles,
distances of the plurality of vehicles from other vehicles,
pedal positions of the plurality of vehicles,
steering angles of the plurality of vehicles, or
engine revolutions-per-minute of the plurality of vehicles.

13. The device of claim 7, wherein the vehicle operation data associated with the plurality of vehicles is received from one or more of:
inertial measurement units associated with the plurality of vehicles,
three-axis accelerometers associated with the plurality of vehicles,
global positioning system (GPS) devices associated with the plurality of vehicles,
engine control modules associated with the plurality of vehicles, or
video cameras associated with the plurality of vehicles.

14. A non-transitory computer-readable medium storing instructions, the instructions comprising:
one or more instructions that, when executed by one or more processors, cause the one or more processors to:
receive vehicle operation data associated with operation of a plurality of vehicles;
process the vehicle operation data to generate processed vehicle operation data for a first time period;
extract a plurality of features from the processed vehicle operation data;
train machine learning models, with the plurality of features, to generate trained machine learning models and model outputs;
process the plurality of features, with a feature selection model and based on the model outputs, to select sets of features from the plurality of features;
process the sets of features, with the trained machine learning models, to generate first indications of driving behavior and reliabilities of the first indications of driving behavior;
select a set of features, from the sets of features, based on the first indications of driving behavior and the reliabilities of the first indications of driving behavior;
provide, to a user device associated with a particular vehicle, a request to calculate the selected set of features for a second time period,
wherein the vehicle operation data of the particular vehicle is received, by the user device, from the particular vehicle based on the request, for the second time period;
receiving, from the user device, data identifying the selected set of features for the second time period;
determine, based on the data identifying the selected set of features, a second indication of driving behavior associated with a particular vehicle; and
perform one or more actions based on the second indication of driving behavior associated with the particular vehicle.

15. The non-transitory computer-readable medium of claim 14, wherein the one or more instructions, that cause the one or more processors to perform the one or more actions, cause the one or more processors to one or more of:
provide, to the user device, the second indication of driving behavior associated with the particular vehicle;
provide the second indication of driving behavior associated with the particular vehicle to a particular device associated with an insurer of the particular vehicle;
provide, to the user device, an instruction to address driving behavior based on the second indication of driving behavior associated with the particular vehicle;
cause the particular vehicle to be disabled based on the second indication of driving behavior associated with the particular vehicle;
determine a driver risk score, for a driver of the particular vehicle, based on the second indication of driving behavior associated with the particular vehicle;
retrain at least one of the machine learning models based on the second indication of driving behavior associated with the particular vehicle;
cause a driver training program, focused on driving behavior based on the second indication of driving behavior associated with the particular vehicle, to be scheduled for the driver of the particular vehicle; or
cause the particular vehicle to operate in an autonomous mode until the driver of the particular vehicle completes particular training.

16. The non-transitory computer-readable medium of claim 14, wherein the second indication of driving behavior associated with the particular vehicle includes information identifying one of:
aggressive driving behavior, or
normal driving behavior.

17. The non-transitory computer-readable medium of claim 14, wherein the one or more instructions, that cause the one or more processors to extract the plurality of features from the processed vehicle operation data, cause the one or more processors to:
compute a plurality of statistics based on the processed vehicle operation data,
wherein the plurality of statistics correspond to the plurality of features.

18. The non-transitory computer-readable medium of claim 14, wherein the one or more instructions, that cause the one or more processors to train the machine learning models with the plurality of features, cause the one or more processors to:
utilize a nested cross-validation to tune the plurality of features for the machine learning models and to evaluate the machine learning models;

perform a preliminary analysis, with a first random forest model, to tune the plurality of features; and utilize a second random forest model to classify the plurality of features and to generate the trained machine learning models.

19. The non-transitory computer-readable medium of claim 14, wherein the one or more instructions, that cause the one or more processors to process the plurality of features, with the feature selection model and based on the model outputs, to select the sets of features, cause the one or more processors to:

estimate an importance of each of the plurality of features based on an average Gini importance associated with each of the plurality of features; and select the sets of features from the plurality of features based on the importance estimated for each of the plurality of features.

20. The method of claim 1, wherein processing the plurality of features, with the feature selection model and based on the model outputs, to select the sets of features from the plurality of features, comprises:

ranking each of the plurality of features based on an importance associated with each of the plurality of features to generate rankings of the plurality of features;

filtering the rankings of the plurality of features to generate filtered rankings of the plurality of features;

determining validation accuracies associated with the plurality of features based on the filtered rankings of the plurality of features; and selecting the sets of features, from the plurality of features, based on the validation accuracies associated with plurality of features.

* * * * *